United States Patent
Dzumla et al.

(10) Patent No.: US 10,534,781 B2
(45) Date of Patent: Jan. 14, 2020

(54) WEBSITE TRAFFIC OPTIMIZATION

(71) Applicant: LONGTAIL UX PTY LTD, Drummoyne, NSW (AU)

(72) Inventors: Andreas Dzumla, Drummoyne (AU); Chanon Srithongsook, Drummoyne (AU); Will Santow, Drummoyne (AU)

(73) Assignee: LONGTAIL UX PTY LTD, Drummoyne, NSW ( * ) Notice: Subject to any disclaimer, the term of this patent is extended or adjusted under 35 U.S.C. 154(b) by 156 days.

(21) Appl. No.: 15/022,765

(22) PCT Filed: Sep. 16, 2014

(86) PCT No.: PCT/AU2014/000912
§ 371 (c)(1),
(2) Date: Mar. 17, 2016

(87) PCT Pub. No.: WO2015/039165
PCT Pub. Date: Mar. 26, 2015

(65) Prior Publication Data
US 2016/0232162 A1 Aug. 11, 2016

(30) Foreign Application Priority Data
Sep. 13, 2013 (AU) .................................. 2013903603

(51) Int. Cl.
*G06F 16/2457* (2019.01)
*G06F 16/957* (2019.01)
(Continued)

(52) U.S. Cl.
CPC ...... *G06F 16/24578* (2019.01); *G06F 16/957* (2019.01); *G06F 16/958* (2019.01); *G06F 16/9535* (2019.01)

(58) Field of Classification Search
CPC .......... G06F 17/3053; G06F 17/30864; G06F 17/30867; G06F 17/3089; G06F 17/30899;
(Continued)

(56) References Cited

U.S. PATENT DOCUMENTS 6,421,675 B1 7/2002 Ryan et al.
7,725,422 B2 5/2010 Ryan et al.
(Continued)

FOREIGN PATENT DOCUMENTS

| | | |
|---|---|---|
| EP | 2290606 A1 | 2/2011 |
| JP | 2008-262339 A | 10/2008 |
| WO | WO2007/073262 A2 | 6/2007 |

OTHER PUBLICATIONS http://www.Youramigo.com, printed Jun. 14, 2016, 1 page.
(Continued)

*Primary Examiner* — Jay A Morrison
(74) *Attorney, Agent, or Firm* — Barnes & Thornburg LLP

(57) ABSTRACT

A system for generating web pages for improving organic search rankings, associated with a website, the system comprising: a keyword generating module adapted to: retrieve one or more candidate keyword sets associated with website content, analyze the candidate keyword sets, and generate one or more target keyword sets based on the analysis of the candidate keyword sets; a web page generating module adapted to: retrieve website content data associated with the website content, and generate web pages based on the generated target keyword sets and the retrieved website content data; wherein the web page generating module is further adapted to communicate with a publicly visible web page server to enable the publicly visible web page server to store and serve the generated web pages; and a link logic module adapted to: define one or more of i) a
(Continued)

number of links and ii) a type of link relationship between the target keyword sets, keywords in the target keyword sets, the web pages generated and pages on the website, and communicate with a link module adapted to retrieve and display the links defined by the link logic module on the website to make the links visible to search engines.

36 Claims, 13 Drawing Sheets

(51) Int. Cl.
*G06F 16/958* (2019.01)
*G06F 16/9535* (2019.01)

(58) Field of Classification Search
CPC ............ G06F 16/24578; G06F 16/958; G06F 16/957; G06F 16/9535; G06F 16/951; G06Q 30/0241
See application file for complete search history.

(56) References Cited

U.S. PATENT DOCUMENTS

| | | | | |
|---|---|---|---|---|
| 8,364,662 | B1* | 1/2013 | Moyer | G06F 17/30864 707/706 |
| 8,645,411 | B1* | 2/2014 | Bandaru | G06F 17/217 707/769 |
| 9,075,882 | B1* | 7/2015 | Ward | G06Q 30/0631 |
| 9,710,436 | B1* | 7/2017 | Bandaru | G06F 17/217 |
| 2007/0168465 | A1 | 6/2007 | Toppenberg et al. | |
| 2008/0010142 | A1* | 1/2008 | O'Brien | G06F 17/30864 705/14.72 |
| 2009/0150345 | A1 | 6/2009 | Van Luchene | |
| 2009/0210409 | A1* | 8/2009 | Levin | G06F 17/30864 |
| 2009/0292677 | A1 | 11/2009 | Kim | |
| 2009/0299998 | A1 | 12/2009 | Kim | |
| 2010/0005063 | A1 | 1/2010 | Krieg et al. | |
| 2010/0114864 | A1* | 5/2010 | Agam | G06F 17/30864 707/709 |
| 2011/0219295 | A1 | 9/2011 | Adams et al. | |
| 2013/0046747 | A1* | 2/2013 | Gouyet | G06F 17/30864 707/709 |
| 2013/0091142 | A1 | 4/2013 | Joseph et al. | |
| 2013/0325834 | A1* | 12/2013 | Simburg | G06F 16/951 707/706 |

OTHER PUBLICATIONS http://www.sli-systems.com.au/solutions/site-champion, printed Jun. 14, 2016, 1 page.
European Search Report for Application No. 14845926.6-1952/ 3047403, dated Mar. 15, 2017, 11 pages.
Saraswathi, D., et al., "Link Farm Detection using SVMLight Tool," 2012 International Conference on Computer Communication and Informatics (ICCCI-2012), Jan. 10-12, 2012, Coimbatore, India, 6 pages.
English Translation of Notice of Reasons for Rejection for Japanese Patent Application No. JP2016-543264, dated Sep. 4, 2018, 4 pages.

* cited by examiner

WEBSITE TRAFFIC OPTIMIZATION

CROSS-REFERENCE TO RELATED APPLICATIONS

This application is the U.S. national phase of PCT/AU2014/000912, filed on Sep. 16, 2014. PCT/AU2014/000912 claims priority to Australian Patent Application 2013903603, filed on Sep. 19, 2013. The disclosures of both Australian Patent Application 2013903603 and PCT/AU2014/000912 are hereby incorporated herein by reference in their entireties.

FIELD

The present invention relates to improvements in website traffic optimization. In particular, the present invention relates to a system and method of generating web pages for improving a website's organic search rankings in search engines and a keyword generating system for generating keyword sets for use in improving a website's organic search rankings of a website.

BACKGROUND

Web sites are used by entities to advertise their products and services in order to attract customers and increase sales of those products and services. In many cases, potential customers rely on internet search engines, such as Google™, Yahoo!™, Bing™ etc. to perform keyword searches to find entities that sell certain products or services that they are looking for. In this context potential customers perform a keyword search using a search engine and either find the products/services in the "organic search listings" ranked by relevance, or in the "paid search listings" (which are paid ads displayed by an auction model such as AdWords, for example, where in the auction relevance is a factor but a cost-per-click bid is another important factor). It is becoming increasingly important for these entities to have their particular website feature highly in the organic search results provided by these search engines. In situations where the entity's website is not featured on the first few pages (or even the first page) of the organic search result listings, potential traffic to their website via these search engines can be lost or these entities have to invest significant money in cost-per-click advertising on the paid search results.

Website owners have been performing search engine optimisation (SEO) of their own websites, or have paid external agencies to perform SEO on their websites, since the early days of internet search engines. SEO can be divided into two main areas: off-page optimisation and on-page optimisation.

Off-page optimisation refers mainly to achieving web links and other external signals like social media signals (for example, Facebook likes and shares, Twitter mentions, Social tagging etc.) to point back to the website, to improve the web authority profile of the website to the eyes of the search engines. These techniques have become increasingly frowned upon and restricted by search engine quality guidelines, and can lead to search engine penalties with the website losing rankings if these artificial techniques to acquire link and social signals are detected by search engines.

On-page optimisation refers to optimising the actual website itself: the code, content and website structure. Traditionally on-page optimisation require IT resources for any web changes. There is also the risk of negative effects of any changes introduced on search engine rankings, since the exact search engine ranking algorithms are not disclosed.

A known technique for on-page optimisation is the creation of additional content, creating additional web pages manually optimised for so called "Longtail" keywords. Longtail Keywords are search word combinations or sets of keywords of usually more than 2 or 3 words, which individually do not account for many searches on search engines, but taken together can represent 50%-70% of search engine searches and subsequent traffic to the websites appearing in the search results. The other benefits of Longtail keyword traffic is that the competition for these search terms among web pages in the search engine index is not as fierce as for "head terms" (the main search terms most searched for in any category/industry); also website conversion rates from traffic to online sales tend to be higher, since the user is already looking for something very specific (e.g. "used ford falcon station wagon with registration" as opposed to head term "car sales online" or "used cars"). The challenge with manually creating pages for different Longtail keyword combinations is both scale, and knowing which Longtail keywords to select and to build optimised pages for, to avoid wasting valuable IT resources on building pages for low traffic combinations which already have a high SEO competition.

Another challenge for both on-page and off-page SEO is however, that it is virtually impossible to attribute an exact return on investment (ROI) to any specific SEO action taken: website rankings in search engines constantly fluctuate with search engine algorithm changes, competitor website adaptions, the development and rise of new websites and seasonality effects in the market. Also, search engines try to not give immediate feedback with immediate ranking changes on any website changes, to avoid the risk of website owners systematically testing off-page or on-page SEO tactics to game the ranking system, which in theory should be based on purely ranking web pages by order of relevance to the users' search query on the search engine.

The present invention aims to overcome, or at least alleviate, some or all of the afore-mentioned problems.

Further objects and advantages of the invention will be brought out in the following portions of the specification, wherein the detailed description is for the purpose of fully disclosing the preferred embodiment of the invention without placing limitations thereon.

The background discussion (including any potential prior art) is not to be taken as an admission of the common general knowledge in the art in any country. Any references discussed state the assertions of the author of those references and not the assertions of the applicant of this application. As such, the applicant reserves the right to challenge the accuracy and relevance of the references discussed.

SUMMARY OF INVENTION

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components that the use directly references, but optionally also the inclusion of other non-specified components or elements. It will be understood that this intended meaning also similarly applies to the terms mentioned when used to define steps in a method or process.

It will be understood that, when describing various integers, such as modules, components, elements etc., any integer may be constituted by a single integer or multiple integers.

Various aspects of the present disclosure include a system and/or method of generating web pages for improving organic search results and/or search result rankings associated with a website. The system or method provides a backend system including a database where links are defined. Links may be defined in one central space. Logic may be provided to link existing web pages of a website to hosted web pages. Web pages may be hosted on a managed subdomain or subdirectory. A link module may display links to the hosted web pages. The displayed links may be provided by the database automatically upon request by the link module. Hosted web pages may display content in the form of search results. Search results may be obtained by performing keyword searches against the content in the database. Database content may include data fed from the website, such as product and service feeds. Hosted pages may be systematically interlinked with other hosted pages and the website. Generated web pages may be cached and search engine optimised. Keyword sets may be algorithmically calculated based on search engine competition, user search volumes and client conversion rate history for downstream search query traffic. Generated web pages may be presented to search engine crawlers for indexing.

According to one aspect, the present invention provides a system for generating web pages for improving organic search rankings, associated with a website, the system comprising: a keyword generating module adapted to: retrieve one or more candidate keyword sets associated with website content, analyse the candidate keyword sets, and generate one or more target keyword sets based on the analysis of the candidate keyword sets; a web page generating module adapted to: retrieve website content data associated with the website content, and generate web pages based on the generated target keyword sets and the retrieved website content data; wherein the web page generating module is further adapted to communicate with a publicly visible web page server to enable the publicly visible web page server to store and serve the generated web pages; and a link logic module adapted to: define one or more of i) a number of links and ii) a type of link relationship between the target keyword sets, keywords in the target keyword sets, the web pages generated and pages on the website, and communicate with a link module adapted to retrieve and display the links defined by the link logic module on the website to make the links visible to search engines.

According to a further aspect, the present invention provides a method for generating web pages for improving organic search rankings associated with a website, the method comprising the steps of: a keyword generating module retrieving one or more candidate keyword sets associated with website content, analysing the candidate keyword sets, and generating one or more target keyword sets based on the analysis of the candidate keyword sets; a web page generating module retrieving website content data associated with the website content, and generating web pages based on the generated target keyword sets and the retrieved website content data; wherein the web page generating module is further adapted to communicate with a publicly visible web page server to enable the server to store and serve the generated web pages; and a link logic module defining one or more of i) a number of links and ii) a type of link relationship between the target keyword sets, keywords in the target keyword sets, the web pages generated and pages on the website, and communicating with a link module adapted to retrieve and display the links defined by the link logic module on the website to make the links visible to search engines.

According to yet a further aspect, the present invention provides a keyword generating system for generating keyword sets for use in improving organic search rankings associated with a website, the keyword generating system comprising: a keyword generating module adapted to: retrieve one or more candidate keyword sets associated with website content, analyse the candidate keyword sets, and generate one or more target keyword sets based on the analysis of the candidate keyword sets, wherein the keyword generating module is further adapted to analyse a first candidate keyword set by performing a search on a search engine using the first candidate keyword set and producing a first target keyword set based on at least one keyword score that is based on the organic results of the search, obtain organic search results from the search engine for a first candidate keyword set, determine the keyword score based on the organic search results, determine whether the keyword score is above a defined score threshold value, and upon a positive determination that the keyword score is above a defined score threshold value, base a first target keyword set on the first candidate keyword set.

According to yet a further aspect, the present invention provides a method of generating keywords for use in improving organic search rankings associated with a website, the method comprising the steps of: a keyword generating module retrieving one or more candidate keyword sets associated with website content, analysing the candidate keyword sets, and generating one or more target keyword sets based on the analysis of the candidate keyword sets, wherein the step of analysing a first candidate keyword set comprising the further steps of performing a search on a search engine using the first candidate keyword set and producing a first target keyword set based on at least one keyword score that is based on the organic results of the search, obtaining organic search results from the search engine for a first candidate keyword set, determining the keyword score based on the organic search results, determining whether the keyword score is above a defined score threshold value, and upon a positive determination that the keyword score is above a defined score threshold value, basing a first target keyword set on the first candidate keyword set.

BRIEF DESCRIPTION OF DRAWINGS

Embodiments of the present invention will now be described, by way of example only, with reference to the accompanying drawings, in which.

DESCRIPTION OF EMBODIMENTS

Figure 1:
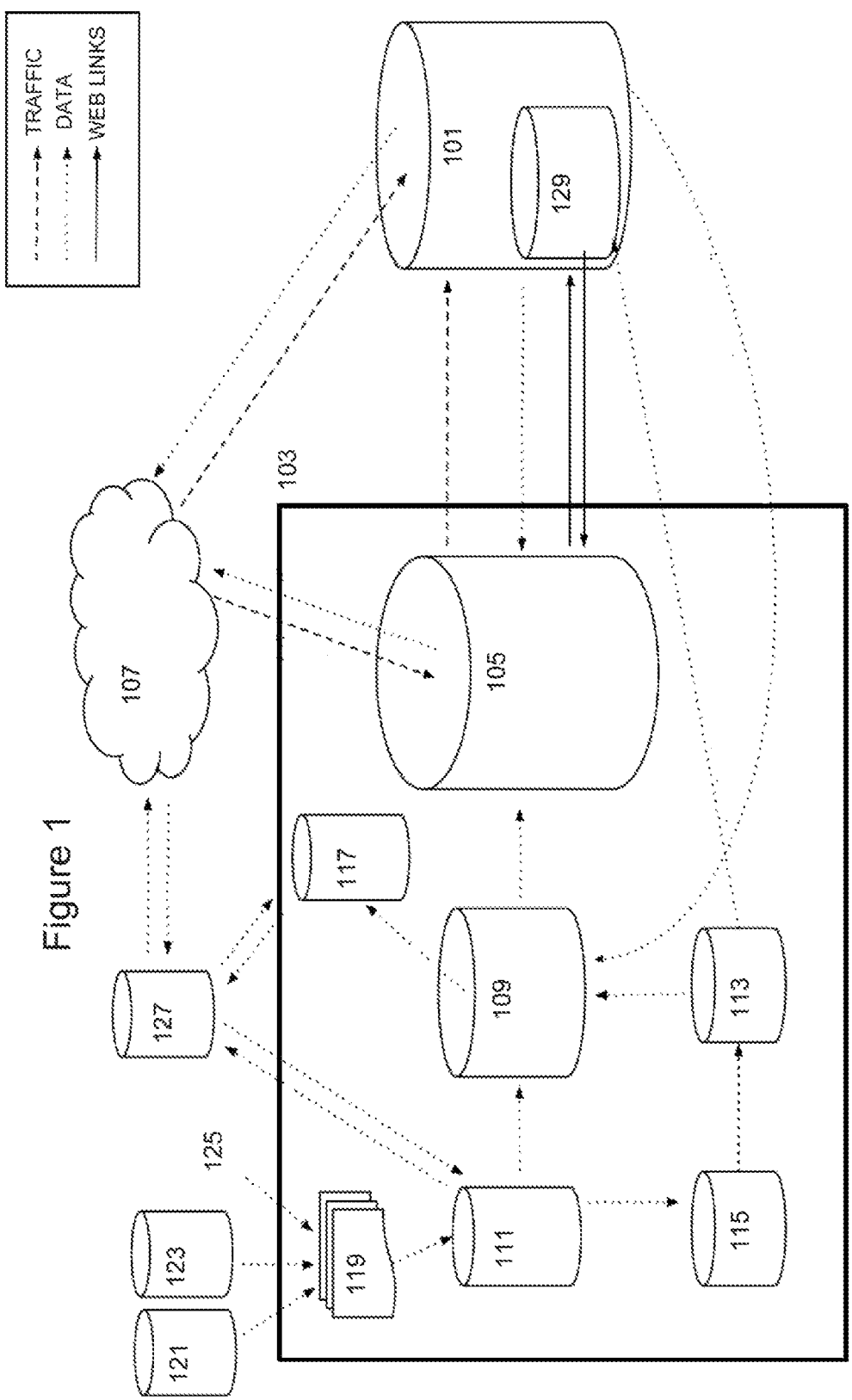
FIG. 1 shows a general system block diagram according to an embodiment of the present invention.

The following description provides specific examples of a system and method of generating additional web pages for improving organic search results associated with an original website. The web pages are intended to be generated by a third party and hosted (i.e. stored and served) on a server via a subdomain of the original website that points to the IP address of the server or via a subdirectory displaying the server content with a reverse proxy URL rewrite. The web pages are generated in such way as to provide additional search traffic by way of improved search engine results. The search engine results for the original website are improved by creating or generating web pages from target keyword sets that are associated with the original website's content, such as products and/or services that are offered via the original website. The generated web pages are linked to the original website using a number of different linking techniques in order to attract incremental search traffic onto the new web pages which can then funnel through to the original website.

In summary, the system includes one or more processors, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the system may include one or more communication devices (wired or wireless) for communicating with external and internal devices, and one or more input/output devices, such as a display, pointing device, keyboard or printing device.

The one or more processors are arranged to perform the steps of one or more programs stored as program instructions within the memory device. The program instructions enable the various methods of performing the invention as described herein to be performed. The program instructions may be developed or implemented using any suitable software programming language and toolkit, such as, for example, a C-based language and compiler. Further, the program instructions may be stored in any suitable manner such that they can be transferred to the memory device or read by the one or more processors, such as, for example, being stored on a computer readable medium. The computer readable medium may be any suitable medium for tangibly storing the program instructions, such as, for example, solid state memory, magnetic tape, a compact disc (CD-ROM or CD-R/W), memory card, flash memory, optical disc, magnetic disc or any other suitable computer readable medium. It will be understood that program instructions may also be made available from a server accessible via the Internet (i.e. in the "cloud"). In this way, all components of the system may be located within and accessible from the "cloud".

The system may also be arranged to be in communication with external data storage systems or devices in order to retrieve the relevant data.

It will be understood that the system herein described includes one or more elements or modules that are arranged to perform the various functions and methods described. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines. It will be understood that the different modules or engines may be located in any number of different places separately or together, such as in a server accessible via the Internet (i.e. in the "cloud") or located on one or more desktop computing systems.

It will be understood that the arrangement and construction of the modules or engines may be adapted accordingly depending on system and user requirements so that various functions may be performed by different modules or engines to those described herein, and that certain modules or engines may be combined into single modules or engines or the functions of the herein described modules or engines may be separated out into different modules or engines.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

FIG. 1 shows a general system block diagram. An original website 101 of a client is provided. An external (back end) system 103 has a publicly visible server 105 that is visible to an Internet search engine 107, such as Google™ for example.

The system 103 also has a web page generating module 109, a keyword generating module 111, a link logic module that has a link relationship database 113 and a link logic calculator 115, and a keyword ranking module 117.

The website 101 and server 105 are visible to the search engine 107 for purposes of indexing as indicated by the data arrows between the website 101 and the search engine 107, and between the server 105 and the search engine 107.

Existing keyword visitor traffic passes from the search engine 107 to the client website 101. Search engine indexing data passes from the client website 101 to the search engine 107. Additional (new) keyword visitor traffic passes from the search engine 107 to the server 105, according to various embodiments as described herein. Search engine indexing data passes from the server 105 to the search engine 107. Visitor traffic also passes from the server 105 to the client website 101.

When a potential customer searches for a particular website, one or more keywords are chosen to produce a keyword phrase, or keyword set. It will be understood that a keyword set may include one or more keywords. An example of a keyword set is "buy cheap {product name} from {city}". As shown in FIG. 1, keyword phrase traffic occurs between the internet search engine 107 and the client website 101. As described in more detail in FIG. 2, which shows a general process flow diagram, the system as shown in FIG. 1 performs a number of steps and processes to optimise website traffic associated with the website 101.

The keyword generating module 111 obtains or retrieves a number of candidate keyword sets (i.e. set of keywords) that are associated with the content on the client website 101. The candidate keywords in these sets are then filtered by the keyword generating module. These identified keywords are used to develop additional externally hosted web pages. That is, the candidate keyword sets are selected from non-filtered keywords 119 that may be obtained from an advertising tool 121 associated with a search engine, such as Google Adwords™, a client website analytical tool 123 or via manual entry 125 of keywords. It will be understood that other tools may also be used, such as webmaster tools, search query reports, Adwords keywords tools etc.

The keyword generating module performs a number of different processes, as described in detail herein, to analyse and determine whether the candidate keyword sets are suitable as target keyword sets. That is, the keyword generating module determines whether the keywords within the candidate keyword sets produce search results that could potentially improve web traffic associated with the client website 101. Search results are obtained by requesting searches via the search engine API 127 and analysing those results to determine the quality of the keywords within the keyword set.

Once the analysis is complete, the target keyword sets are provided (or fed) to the link logic calculator 115 and the web page generating module 109. The link logic calculator 115 also receives category details from the keyword generating module where keyword sets have been categorised according to the client's website content. The link logic calculator 115 defines a number of web links between the pages generated by the web page generating module and pages hosted by the original website 101. That is, the link logic calculator defines internal link relationships between the generated webpages, as well as external link relationships between the generated web pages and categories. Further, the link logic calculator 115 defines the types of link relationships between the target keyword sets, keywords in the target keyword sets, and the web pages generated by the web page generating module and pages on the website 101. Details of these links are stored in the link relationship database 113 for retrieval by the web page generating module 109. That is, the link relationship database stores/includes definitions of the number of web links and the type of link relationship between all target keyword sets and the generated web pages.

The web page generating module 109 obtains or retrieves website content data (client content feed) in the form of product, service or category descriptions and details provided by or fed from the client website 101. Further, the web page generating module 109 can also communicate with the link relationship database 113 in order to receive link details.

The client provides the website content (including product feed details) in any suitable format, such as CSV or XML data formats. Alternatively, the website content (including the product feed) may be provided as a CSS feed or via an API. This content feed is fed from the client's website to the database. The data provided by the website is stored in the database to enable internal search results to be generated using target keywords to search the content feed. In other words, the generated iSERP (web page) is effectively a number of internal search results performed on the database against the website content using the longtail keywords.

Additional information can be added to the database to assist with producing the web pages. For example, product tagging enables particular products to be grouped together by way of defined categories. By defining additional categories, further web pages may be generated that are associated with those categories.

The web page generating module 109 generates internal search engine results pages (iSERPS) based on the target keywords, website content data fed from the client website 101 and the link relationships stored in the link relationship database 113. The web pages are generated in batches based on groups of target keyword sets. Each web page generated is associated with a specific keyword set.

The iSERPS are generated in the web page generating module 109 and cached server-side, before they are fed to the server 105. iSERPS are re-cached every time the client's content feed is updated. The cached content is then provided to the client's website each time visitors to the website request the content. This server side caching ensures faster page load times so that when a user loads an iSERP, there is no new query run against the database. Instead, a cached, static HTML page is provided. Regular re-caching is important to ensure freshness of content and to include new products/services in the content database since the last server side cache.

The iSERPs are designed in a manner so that they look like the client's original webpages, using their CSS and parts of their HTML. This process is performed when designing and/or adapting iSERPS to a client's website and provides seamless user experience, low bounce rates and high conversion rates.

There are two ways iSERPS can be displayed under original client domain URLs to users and search engines: subdomain and subdirectory. If the client chooses the iSERPS to be shown to users and search engines through the URLs on a subdomain of the top level domain, then the client delegates a subdomain of the top level domain to the iSERPs and points it to the iSERPs' server IP address.

If the client chooses the iSERPS to be shown to users and search engines through the URLs of a subdirectory of their main domain, then the client assigns a sub-directory to the iSERPS and installs a reverse-proxy URL rewrite for that sub-directory to display the webpage content from the corresponding iSERPS domain URLs.

The generated iSERPS are fed to the server 105 when produced and cached, hosted (i.e. stored and served) on the server 105 and displayed to search engines and users via a subdomain or sub-directory of the client website as described. This server 105 and its stored iSERPS are publicly visible via the search engine 107 as well as via the sub-directory or subdomain of the website 101. This connection provides additional web traffic associated with the original website 101 via the server 105. The server 105 is external to the client website 101. It will be understood that the server 105 may be formed from multiple servers.

The links to client pages (e.g. by category and type of product) defined by the link logic module (i.e. the link logic calculator 115 and the link relationship database 113) are fed to, and so retrieved by, a link module 129 located at the front end system on one or more pages of the website 101. The link module is a small program or piece of code that is provided to the client's website in order to be deployed on the client web pages. This code is publicly visible. The links are displayed on these pages (e.g. home page, category page, product page) of the website 101 by the page linking module (link module), as described in more detail herein. The links displayed on the website 101 are also publicly visible via the search engine 107.

The keyword ranking module 117 is used at predefined intervals to monitor the quality of the target keyword sets. The keyword ranking module 117 monitors and checks the ranking of the target keyword sets, by obtaining search results for the retrieved target keyword sets, analysing the obtained search results to determine if a ranking associated with the obtained search results is below a defined ranking threshold value. If the ranking is below the defined ranking threshold value, the target keyword sets or the link relationships may be modified. For example, the keyword ranking module may provide instructions to the web page generating module to delete an existing keyword, change an existing keyword and/or add a new keyword to the target keyword set. The keyword ranking module may also provide instructions to the web page generating module to delete an existing link, change an existing link and/or add a new link to the generated webpages.

The backend system 103 runs the product and/or content feeds against the target keyword sets. Related and similar keywords are calculated for each keyword in the target keyword set and added to the set. The target keyword set is then used to produce optimised web pages in the form of internal search engine results pages (iSERPs). The backend system also allows modification of the target keyword set algorithm, changes to rules and occurrence algorithm for related and similar keyword definitions, manual or scheduled updates and re-caching to include product feed content updates in generated iSERPs.

Figure 2A:
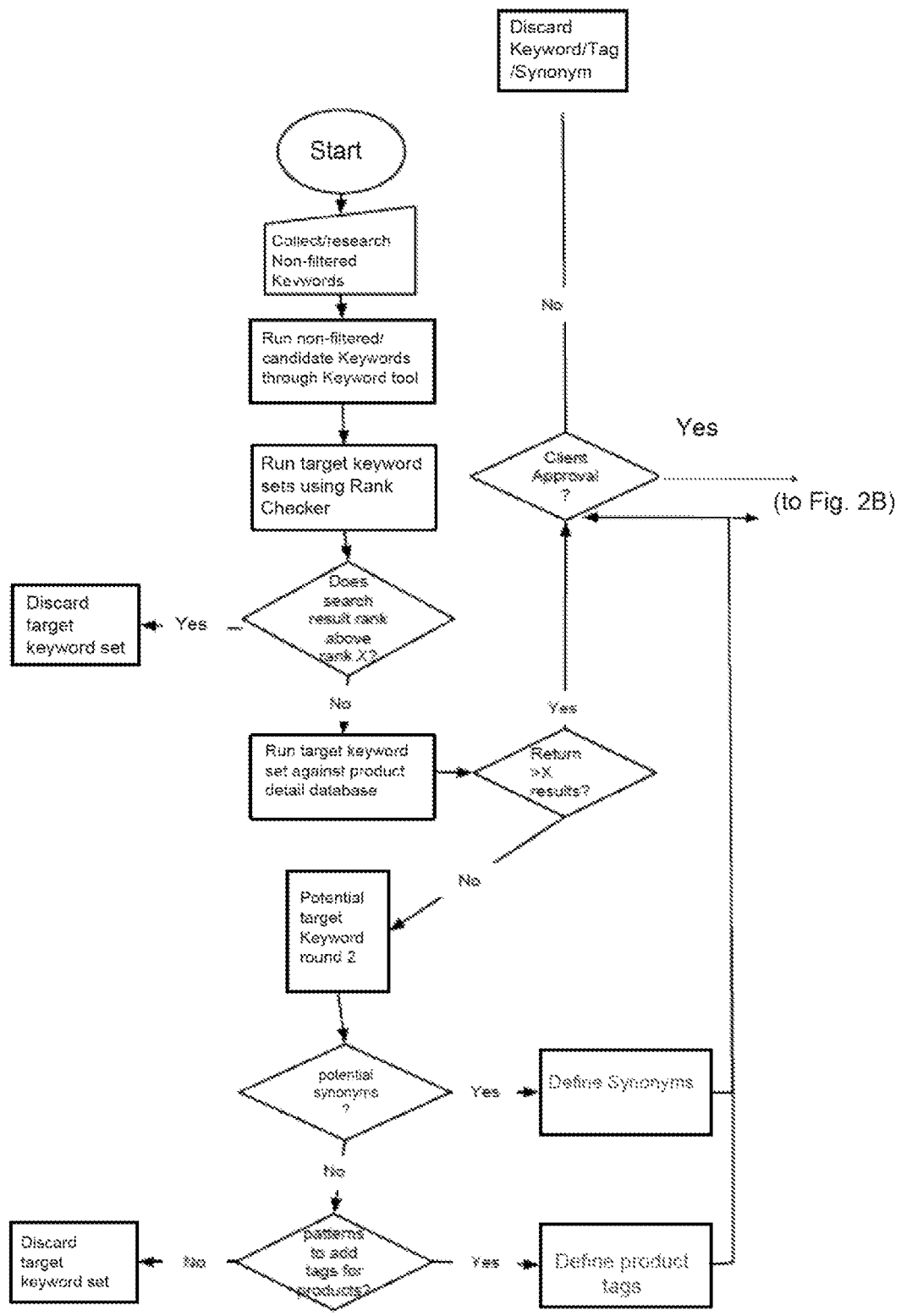
FIG. 2 shows a general process flow diagram according to an embodiment of the present invention.
Figure 2B:
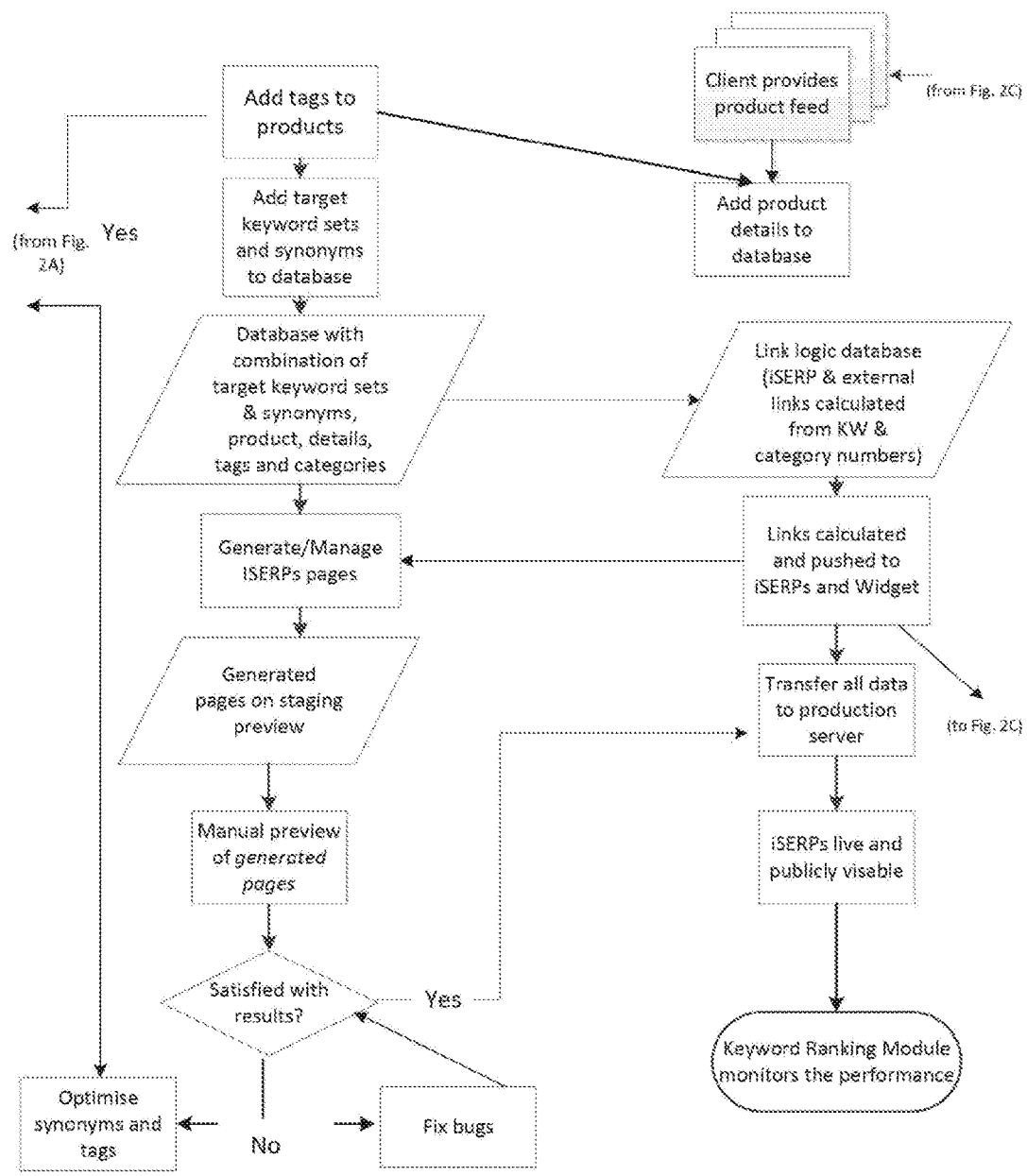
Figure 2C:
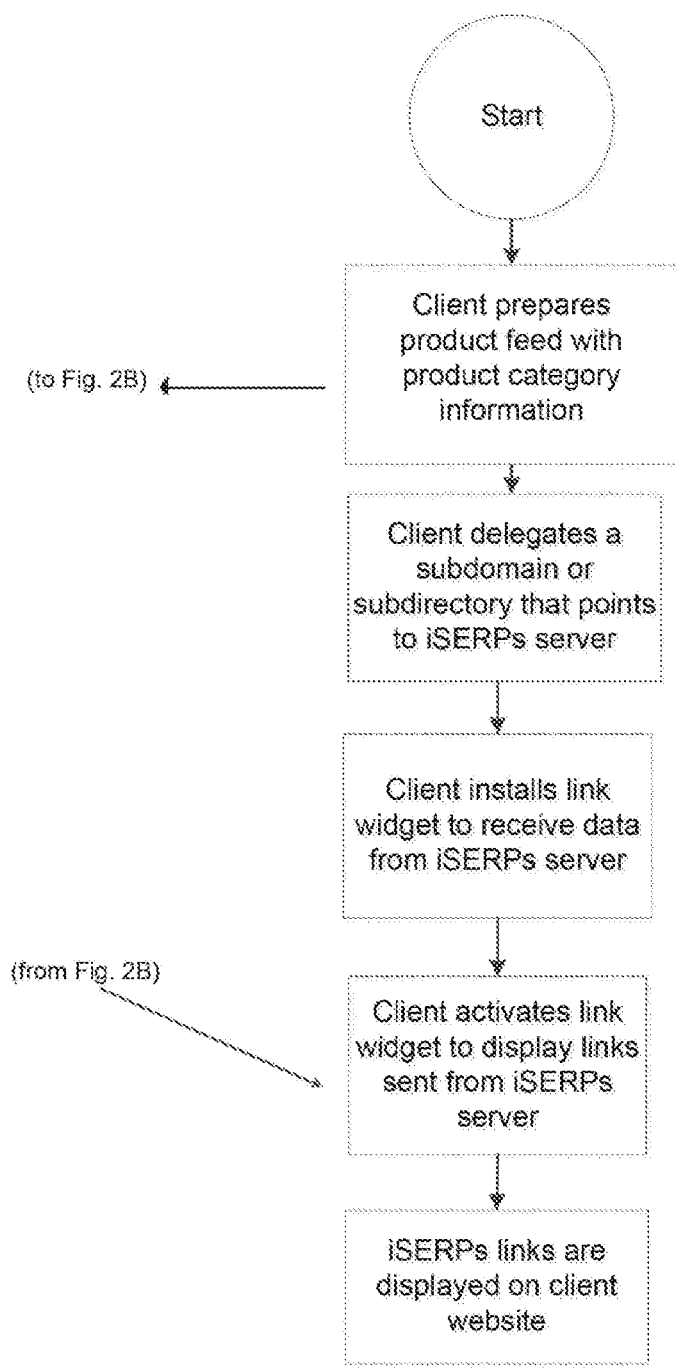

The general process shown in FIG. 2 starts by collecting and researching non-filtered keywords. The non-filtered keywords are identified as candidate keyword sets and are run through the keyword generating module as described herein. Candidate keyword sets that pass the defined score threshold are labeled as target keyword sets and these target keyword sets are analysed by the keyword ranking module, as described herein. A check is made to see whether the website already ranks above a specified rank level in the resultant search results. If the website does rank above a specified rank level, the target keyword set is discarded. Whereas, if the website does not rank above a specified rank level, the target keyword set is run against a product detail database.

A determination is made as to whether a sufficient number of results (based on a predefined value) are returned. If a sufficient number of results are not returned, the process attempts to add further keywords into the keyword set by defining synonyms and product tags as described in more detail below.

The product detail database contains product details (or service details if the website is directed towards the provision of services) obtained from the client's website. If not enough results are returned when comparing the target keyword set against the product detail database, further target keywords are identified by assessing whether there are any potential synonyms. Synonyms are defined and added to the target keyword set.

Alternatively, synonyms may be defined by the backend system and added to the database query when creating the iSERPs. This has the effect that every time a keyword set that contains a keyword with a synonym defined in by the backend system, this synonym keyword is added to the query against the database to populate the search results on the iSERP (this iSERP is then cached as described above).

Tags may also be defined and added to the target keyword set, where the tags are associated with the products advertised on the client's website. The keyword search for the keyword set against the product/services database will then also take those tags into consideration for the population of results on the iSERPs. If there aren't enough synonyms or potential synonyms associated with the keywords in the target keyword set, and/or there aren't enough tags associated with the products, the target keyword set is discarded. Otherwise, the associated synonyms and associated product tags are added to the database.

Once the target keyword set has enough keywords, from a combination of the non-filtered keywords along with additional synonyms and tags, the set of keywords is provided to the client for final approval. If the client does not approve the target keyword set, the target keyword set, tags and associated synonyms may be modified or discarded. Whereas if the client does approve the target keyword set including the synonyms and product tags, the target keyword set and synonyms along with product tags are added to the database. As an alternative, the process may proceed without any interaction with the client for approval.

It will also be understood that, as an alternative, the target keyword set may only contain the non-filtered keywords without synonyms or tags. Optionally, the tags may be sent for approval to the client independently from the target keyword set.

The product tags are associated with the products listed on the client's website. A further process involving the client's website is performed wherein the client prepares a product feed with product category information being made available to the system. The client provides this product feed and the product details are added to the database. It will be understood that the product tags, feeds, category information and details may also relate to services in the case where the client's website advertises a service.

Further, the client delegates a subdomain that points to the iSERPs server IP address. The client installs a link widget onto their homepage, category and product pages, to receive data from the iSERPs server. Before the link widget is activated, the iSERPs are generated and managed by the system 103. The iSERPs utilise links that are calculated and pushed to the web page generating module in the system 103, as well as to the link module located on the client's website. The link logic database communicates with the main database holding the combination of target keyword sets, synonyms, product details, tags and categories. After the client has activated the link module on its website, the links are sent from the iSERPs server and displayed on the client's website. The links displayed on the client's website point to the generated iSERPs. After the iSERPs have initially been generated, they are provided on a staging platform for preview. A manual preview of the generated pages may be performed, and after the system or a user is satisfied that the generated pages are satisfactory, all data may be transferred to a production server. If the results are not satisfactory, either bugs within the system are fixed or synonyms and tags are optimised. Alternatively, a manual review is not required and the data is automatically transferred to the production server. After transfer of all data to the production server, the iSERPs are made live and become publically visible to search engines. At regular intervals, the keyword ranking module monitors the performance of the iSERPs.

Therefore, candidate keywords in a set (i.e. a candidate keyword phrase) are selected by using the new tools discussed herein, external tools and client data. The keywords are run against a Keyword SEO competition algorithm to produce target keywords. The client website rankings are then checked for selected target keywords. If the client website already ranks on page 1 (for example) for any keyword, it is discarded, since it is not desirable to compete for traffic on keywords where the client already ranks well. A determination is then made as to whether all remaining target keywords will retrieve sufficient results (product data) onto the dynamic page that is to be created. For example, even if there are some particularly good keywords, but running them against the product detail database produces zero results, then there is little advantage in using those keywords to generate an iSERP. For example, a minimum of 3 or 5 results may be required before a keyword set is selected.

Figure 3:
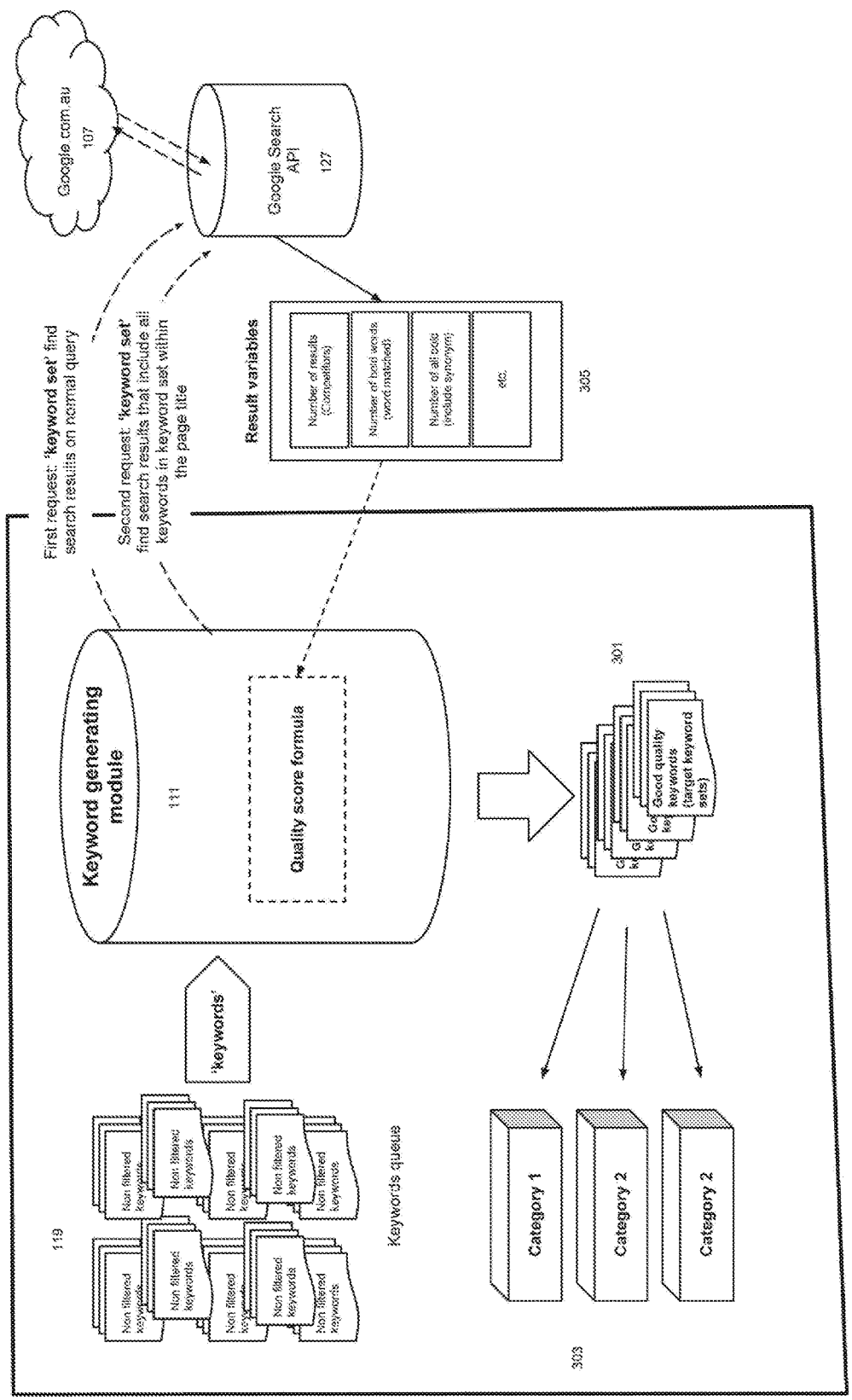
FIG. 3 shows a keyword generating system block diagram according to an embodiment of the present invention.

FIG. 3 shows a keyword generating system block diagram with the keyword generating module 111 receiving non filtered keywords 119 in a keyword set queue. This queue of candidate keyword sets are searched using the search engine 107 via the search engine API 127. A first search type involves a normal standard keyword search to identify results found in web pages in general.

A second search type involves the use of a filter in order to identify organic search results that are found in web page titles. For example, in the second search type, the filter allintitle: is used on Google™ to limit the search to finding the keywords within the candidate keyword set within the title of a web page. Whereas, the first search type does not use a filter and searches for use of the words in the candidate keyword set within the web page and its title.

The allintitle search looks for matches between the keywords in the candidate keyword set and words in the page title tag of the organic search results. One reason for performing allintitle searches is that having all words in the title of a document (i.e. in a page title tag) is a good indicator of a page being specifically optimised for that keyword set. Further, it is known that matching words in page title is a strong signal for relevancy for the search engine, so that the total number of results for an "allintitle" query for a keyword set provides an indication of whether there are many or a few pages competing seriously for the ranking for a specific keyword set on the search engine.

Based on the quality score formula determined from the search results, the candidate keyword sets are approved and become target keyword sets 301. Once approved, the target keyword sets may be allocated to one or more specific categories 303 that are associated with the content on the website 101. These categorized target keyword sets are later fed to the web page generating module. That is, for example, the categories may be based on existing product or service categories identified on the client website. These categories may be provided and identified via the product feed from the client website. Keywords may be matched to the categories by way of filtering. This filtering process may be automated. Descriptors may also be provided to link category information to the keywords.

Further, as indicated in the result variables 305, synonyms of the keywords within the candidate keyword sets can also be matched. For example, the synonyms may be those words that are considered by the search engine to match the keyword in the keyword set based on the search engines algorithms. Further, other similar words may be identified in the search results by the search engine, such as shortened or lengthened versions of the word.

Figure 4:
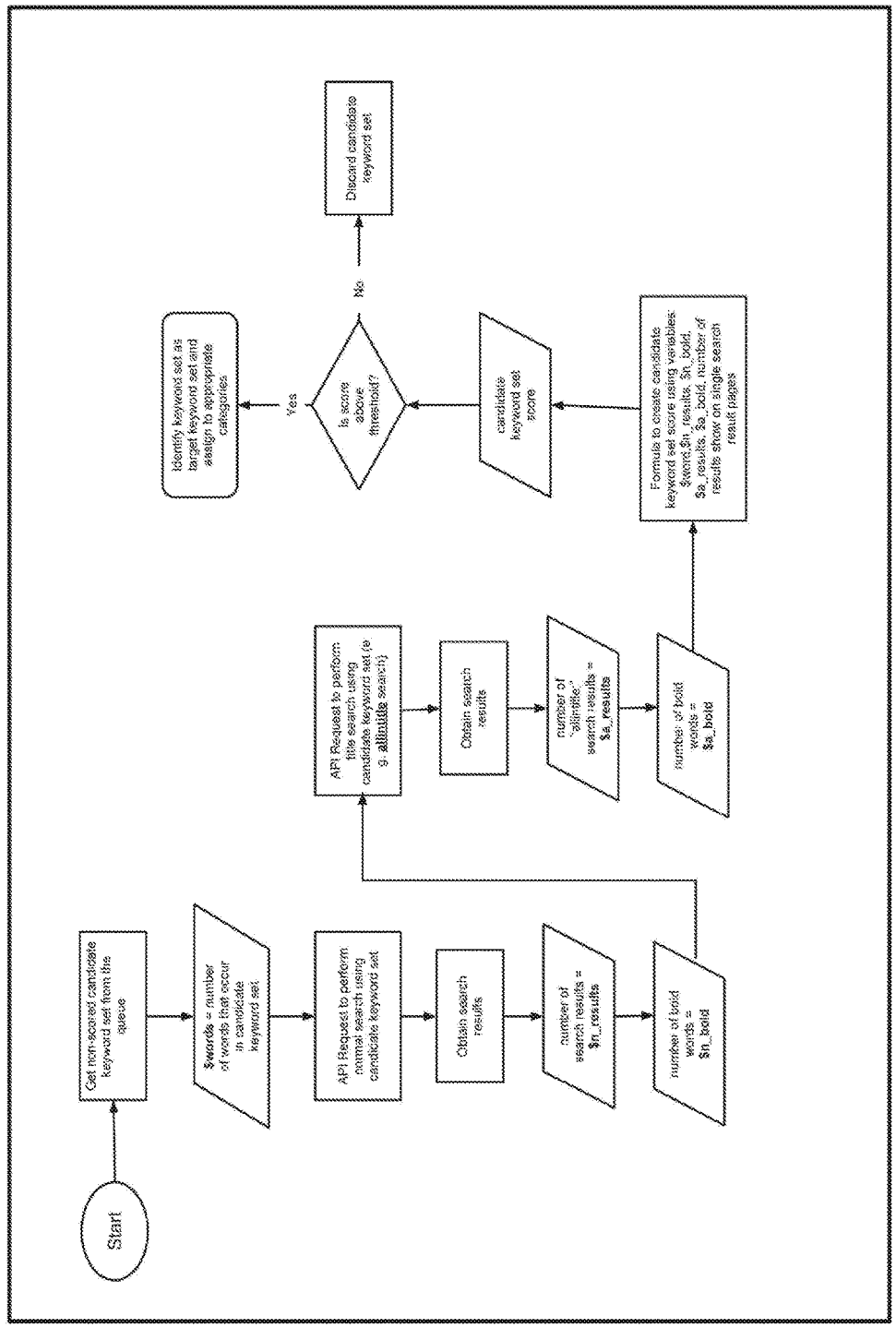
FIG. 4 shows a keyword generating process flow diagram according to an embodiment of the present invention.

FIG. 4 shows a keyword generating process flow diagram performed by the keyword generating module. The process starts by obtaining non-scored candidate keyword sets from a keyword set queue. The number of words that occur within the candidate keyword set is calculated ($words). An API request to perform a normal search using the candidate keyword set is made. The organic search results are obtained. The number of the search results is calculated ($n_results). The number of bold words within the organic search results is calculated ($n_bold). An API request is made to perform a title search using the candidate keyword set. The organic search results are obtained and the number of "allintitle" search results is calculated ($a_results). The number of bold words in the titles is also calculated ($a_bold). It will be understood that different combinations of the herein described variables may be used to calculate a keyword score. According to this embodiment, a formula is provided to create candidate keyword set scores using, for example, the variables $word, $n_results, $n_bold, $a_results, $a_bold, and the number of results shown on the first page of the search engine search results. The candidate keyword set score is checked to see whether the score is above a defined threshold. If the score is not above a defined threshold, the candidate keyword set is discarded. Whereas if the candidate keyword set score is above the defined threshold, the keyword set is defined as a target keyword set and assigned to appropriate categories.

An example of a suitable algorithm is as follows for keyword set "tafe accounting classes":

{occurance}=3 (the number of words in the candidate keyword phrase/set)

{max_match}={occurance}*10=30 (multiply the number of words in the candidate keyword phrase with the number of search results listed on page 1 of a search website; for example 3×10)

{normal_results_count}=852,000 (the number of search results returned by the search engine)

{allintitle_results_count}=the number of results set of {candidate keyword set} searched with "allintitle:" filter=6; i.e. the number of pages appearing in the organic search results that have a page title tag that includes the words within the candidate keyword set.

{normal_occurance_match}=count how often the words "tafe*, accounting" and "classes" appear in first 10 results in total=17; i.e. matching the exact words in the candidate keyword set (in any order).

{normal_title_bold}=26 (with "accounts" and "course/s" also appearing in bold . . . results may vary slightly depending from which location the search is performed and other factors); i.e. matching words that the search engine considers are a match to the words in the candidate keyword set. For example, synonyms and similar words that are lengthened or shortened versions of the keywords.

{allintitle_occurance_match}=count how often the words "tafe", "accounting" and "classes" appear in first 10 results in total in the search for 'allintitle:tafe accounting classes'=12; i.e. matching the exact words in the candidate keyword set to the words in the page title tag (in any order).

{allintitle_title_bold}=same as above, here again for allintitle query=12; i.e. matching words within the page title tag that the search engine considers are a match to the words in the candidate keyword set. For example, synonyms and similar words that are lengthened or shortened versions of the keywords.

{normal_fptd}={normal_occurance_match}/{max_match}; this is a value that is based on the exact matching of words (in any order) in the keyword set to web page content in a defined set of standard search results.

{allintitle_fptd}={allintitle_occurance_match}/{max_match}; this is a value that is based on the exact matching of words (in any order) in the keyword set to page title tags in a defined set of title search results.

{normal_fpbr}={normal_title_bold}/{max_match}; this is a value that is based on words in the keyword set that are considered to match page title tags in a defined set of standard search results.

{allintitle_fpbr}={allintitle_title_bold}/{max_match}; this is a value that is based on the words in the keyword set that are considered to match page title tags in a defined set of title search results.

A "defined set of title search results" is understood to mean results from a search limited to searching for matches only in page title tags of web pages using a keyword phrase. A "defined set of standard search results" is understood to mean results from a standard search limited to searching for matches in web page content and page title tags using a keyword phrase. The phrase "considered to match" is understood to mean that a search engine considers a word in a page title tag or web page content matches the word in the keyword set due to the word in the page title tag or web page being a synonym or similar word, for example, a lengthened or shortened version of the word in the keyword set.

{normal_fptd}="first page title density"={normal_occurance_match}/{max_match}=17/30=0.56.

{allintitle_fptd}="first page title density for allintitle search"={allintitle_occurance_match}/{max_match}=12/30=0.4.

{normal_fpbr}="first page bolded (word) density"={normal_title_bold}/{max_match}=26/30=0.87.

{allintitle_fpbr}=etc. . . . ={allintitle_title_bold}/{max_match}=12/30=0.4.

{normal_fptd_score}=1−{normal_fptd}
{allintitle_fptd_score}=1−{allintitle_fptd}
{normal_fpbr_score}=1−{normal_fpbr}
{allintitle_fpbr_score}=1−{allintitle_fpbr}

The score values (normal_fptd_score, normal_fpbr_score, allintitle_fptd_score, allintitle_fpbr_score) are used to filter the good keyword sets (where the higher score is the less competitive keyword).

Figure 5:
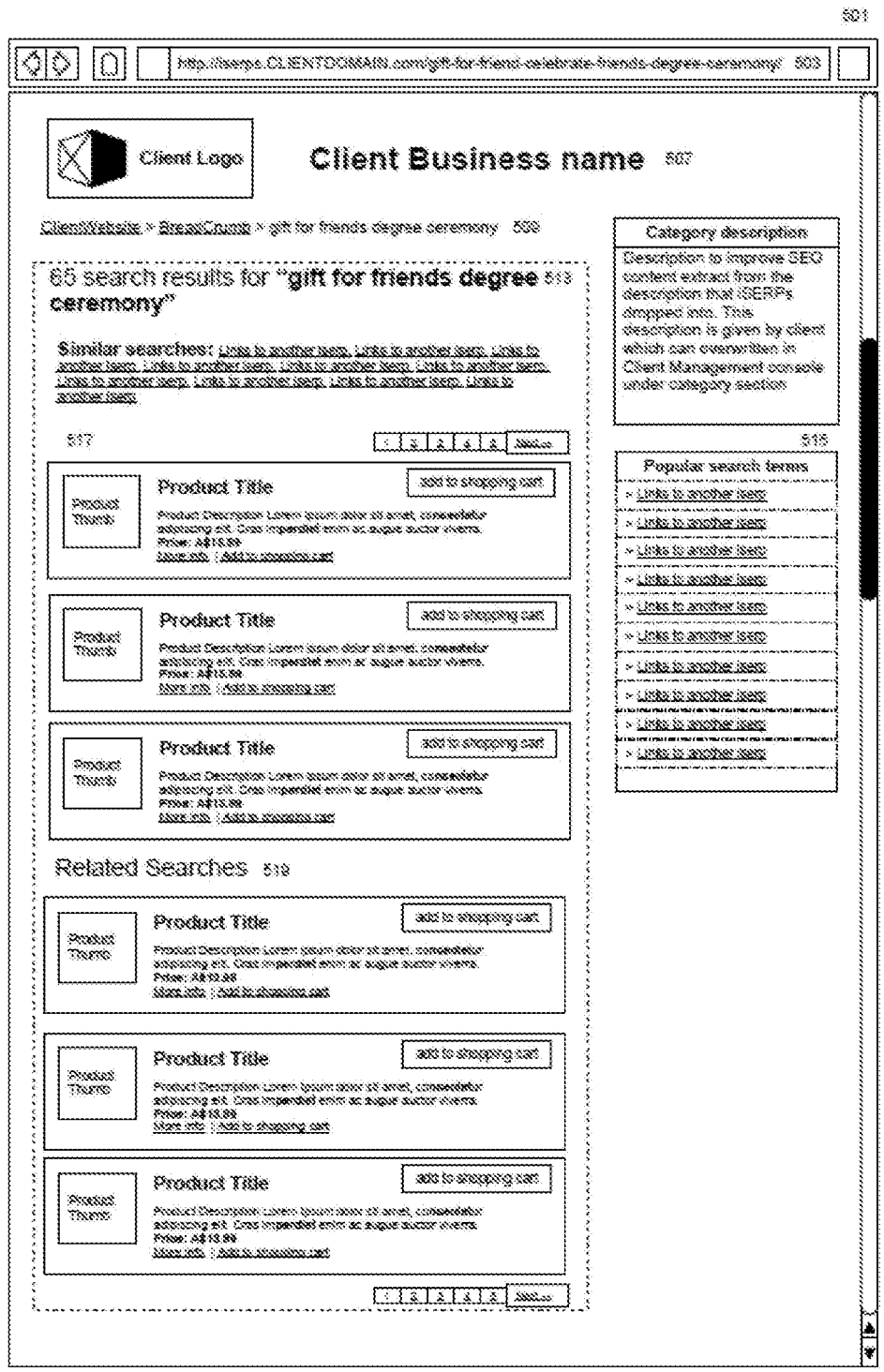
FIG. 5 shows an example of a web page generated by the system according to an embodiment of the present invention.

FIG. 5 shows an example of a web page (iSERP) 501 generated by the system described herein, and in particular by the web page generating module 109. The iSERP has a user friendly URL 503 that identifies the IP address of the server 105 and the client website domain or subdomain. The URL also includes at least some, if not all of the keywords in a target keyword set. The iSERP shows search results based (at least partly) on the keywords entered by a prospective customer in the search engine 107

The client's logo 505 and business name 507 are displayed. Various sections of the web page (iSERP) are allocated for the display of various data and links. In a first section 509 a link (breadcrumb) back to the client's website 101 is provided to give authority back to the client's website webpage. In a second section 511, a category description obtained from a feed of website content from the website 101 is provided. In a third section 513, links to other iSERPS are provided according to a "similar search" performed by the webpage generating module 109 (see FIGS. 7 and 8). In a fourth section 515, links to other iSERPS are provided according to a "popular search" performed by the web page generating module 109 (see FIGS. 7 and 9). In a fifth section 517, the main search results are provided based on exact matches to the search terms provided by the prospective customer to the search engine 107. That is, exact matching means matching all words in the keyword set, in any order. In a sixth section 519, related searches are provided based on search results that are related to the search terms provided by the prospective customer to the search engine 107. In the main and related search result sections (517 and 519) product details including title, thumbnails and product keywords and prices are displayed. The product keywords are chosen based on matching the words in the keyword set to the database of product details provided from the client website. The product keywords may also include synonyms.

It will be understood that any number of links may be provided. According to this embodiment, it is preferable to have 1 to 10 links per category depending on the number of keywords in the keyword set.

Certain sections within the iSERP are used to display permanent data, i.e. data that only requires the data to be stored once in cache as it is not constantly being updated. Other sections within the iSERP are used to display dynamic data which is constantly being updated and so needs to be reached. Examples of sections that display permanent data are the sections 505, 507, 509 and 513. Examples of sections that display dynamic data are sections 511, 515, 517 and 519.

Figure 6:
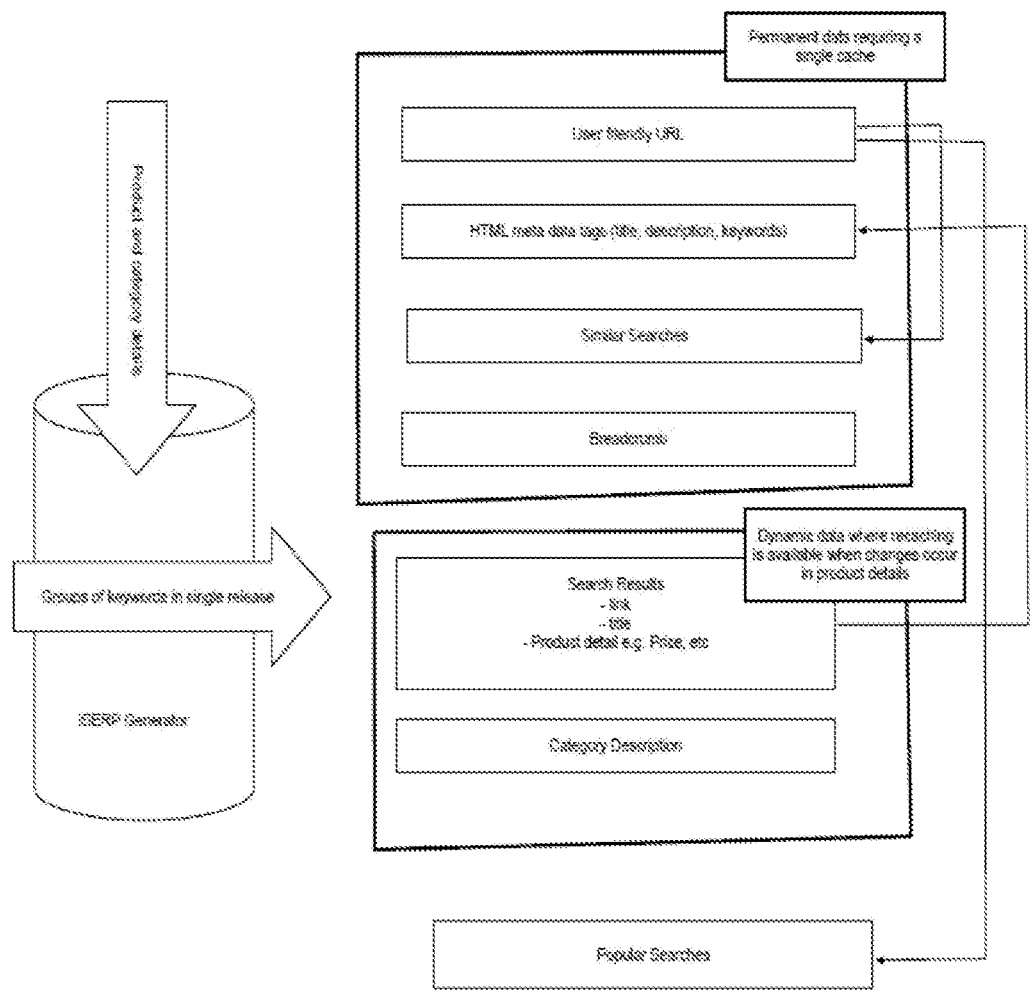
FIG. 6 shows a web page generating process according to an embodiment of the present invention.

FIG. 6 shows a web page generating process for generating a user friendly URL. HTML metadata tags, "similar search" links to other iSERPS, breadcrumb link, search results and product details based on the search query entered into the search engine, category descriptions obtained from the website and product feeds, and "popular search" links to other iSERPS.

iSERPS elements are developed based on a combination of products (or services), categories and keywords that are used to search among those products (or services) and categories. Some elements require other elements to be created first. The arrows in FIG. 6 indicate where elements might require input from other elements before they are created.

The interrelationship between various elements of the generated web pages (iSERPS) is indicated. For example, it can be seen by the arrows that the "similar searches" section and "popular searches" section require the user friendly URL to be generated first. Further, the HTML metadata tags (such as the title, description and keywords) require the search results to be generated first. Various elements are based on combinations of other elements such as the product details, category details and keywords used to search those products and categories on the client's website 101.

One or more breadcrumb links may be provided within each generated iSERP including a link to the homepage of the client's website, a link to the subdomain home and a link to the product category page on the client's website.

Figure 7:
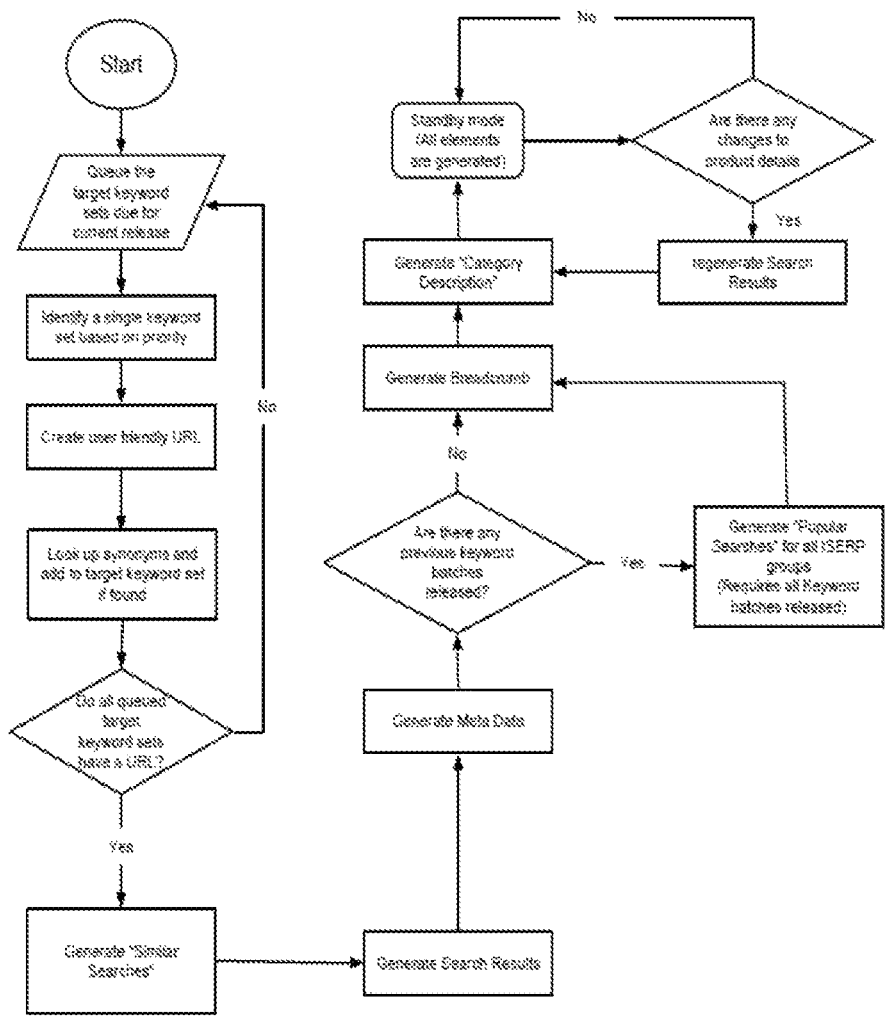
FIG. 7 shows web page generating process flow diagram according to an embodiment of the present invention.

FIG. 7 shows a web page generating process flow diagram. The process starts by queuing the target keyword sets due for current release. A single target keyword set is then identified based on priority in terms of its position in the batch list. A user friendly URL is created using at least a subset of the words within the target keyword set. Synonyms are determined and associated with the target keyword set if found. A determination is made whether all target keyword sets within the queue have an associated user friendly URL. If a negative determination is made, the process returns to queuing the target keyword sets due for current release. If no more target keyword sets are available (i.e. a positive determination is made), then "similar searches" are generated. Following this, standard search results are also generated followed by metadata being generated. A check is made to see whether any previous keyword batches have been released. If so, "popular searches" are generated for all iSERP groups. If there are no previous keyword batches released, one or more breadcrumbs are generated. Following that, a category description is generated and the system enters standby mode. If there are no changes to product details, the system stays in standby mode until the iSERP is published. If changes are to the product details are detected, search results may be re-generated.

Figure 8:
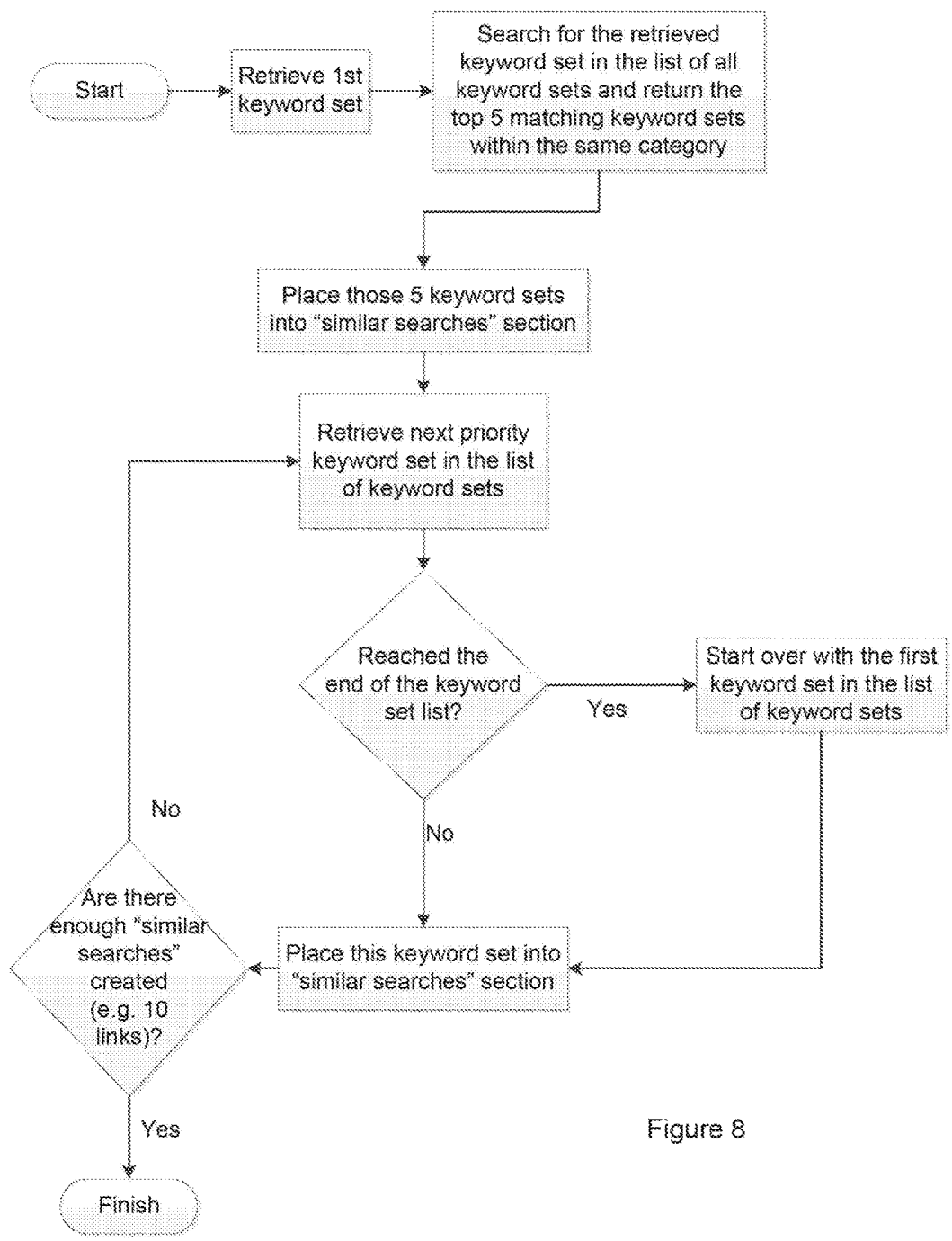
FIG. 8 shows a further web page generating process flow diagram according to an embodiment of the present invention.

FIG. 8 shows a further web page generating process flow diagram for generating "similar search" links performed by the web page generating module 109. The process starts by obtaining a batch of target keyword sets. A first target keyword set is selected and a search is performed in the database to identify five other target keyword sets in the batch that best match the first target keyword set. That is, a search is made for this single keyword set in the list of all keyword sets and the top 5 matching Keyword sets within the same Category are returned. Each of those identified target keyword sets would have an associated generated web page and so links are created to link the iSERP being generated for the first target keyword set to the previously created iSERPs associated with the five identified other target keyword sets. These links are identified on the iSERP currently being generated in the "similar searches" section.

A further "similar search" link may be generated by identifying one or more "next" target keyword sets in the batch. The next target keyword sets may be determined by jumping a defined number of steps or intervals in the list of target keyword sets in the batch. For example, the second target keyword set in the list may first be identified, followed by an interval of twenty to identify the $22^{nd}$ and $42^{nd}$ target keyword sets in the batch list. An iSERP link is then generated to point to the iSERP that is associated with each of these "next" target keyword sets.

A determination is made as to whether the end of the target keyword set batch has been reached. If so, the interval to determine the next link from the list of target keywords jumps back to the start of the keyword batch. If not, the remaining target keyword sets in the batch are formed into "similar search" links in the same way as described above. A determination is then made as to whether enough "similar search" links have been produced to reach a defined number of links, for example, ten links. If enough "similar search" links are not produced, the next target keyword set in the list within the batch of target keyword sets is obtained and the process is continued.

Figure 9:
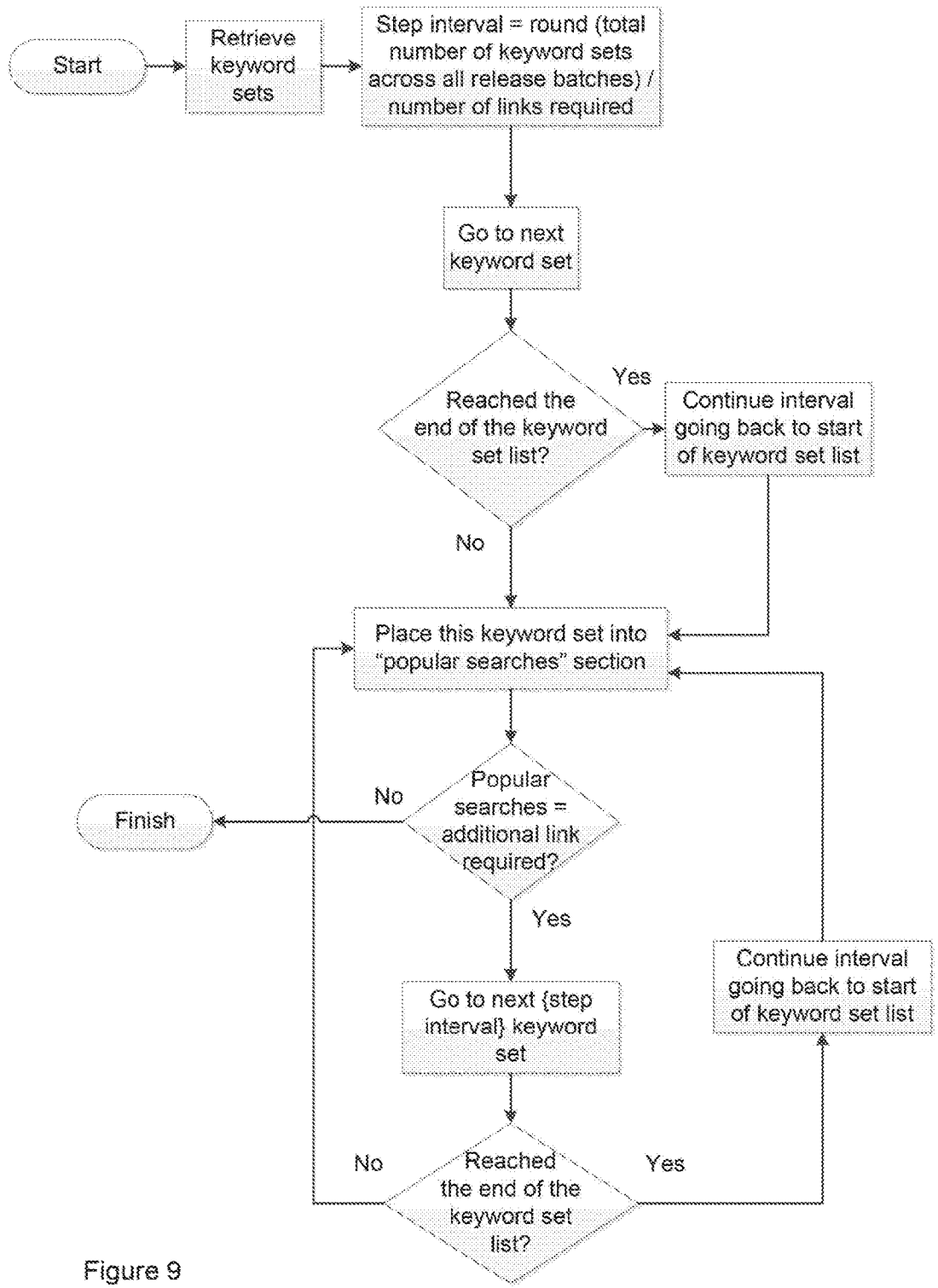
FIG. 9 shows yet a further web page generating process flow diagram according to an embodiment of the present invention.

FIG. 9 shows yet a further web page generating process flow diagram performed by the web page generating module. The process starts by determining a step interval based on the number of keyword sets across all release batches and the number of links required. For example, if the number of links required is ten links and the total number of keyword sets=1,201, then the step interval may be determined to be 120. The next keyword set identified based on the step interval is obtained and a determination is made whether the end of the target keyword set batch list has been reached. If the end of the keyword set list has been reached, the interval is continued by going back to the start of the keyword set list. If the end of the keyword set list is not reached, the identified keyword sets are used to create the "popular search" links which point to the associated iSERP for the identified keyword set. A determination is then made whether enough popular search links have been created. If not, the next keyword set based on the step interval is obtained and a determination is made whether the end of the keyword set list in the current batch has been reached. If the end of the keyword set list has been reached, the interval is continued jumping back to the start of the keyword list. The keyword set is then identified and a "popular search" link is created to point to the associated iSERP. After a determined number of "popular search" links have been created, the process is finished.

Figure 10:
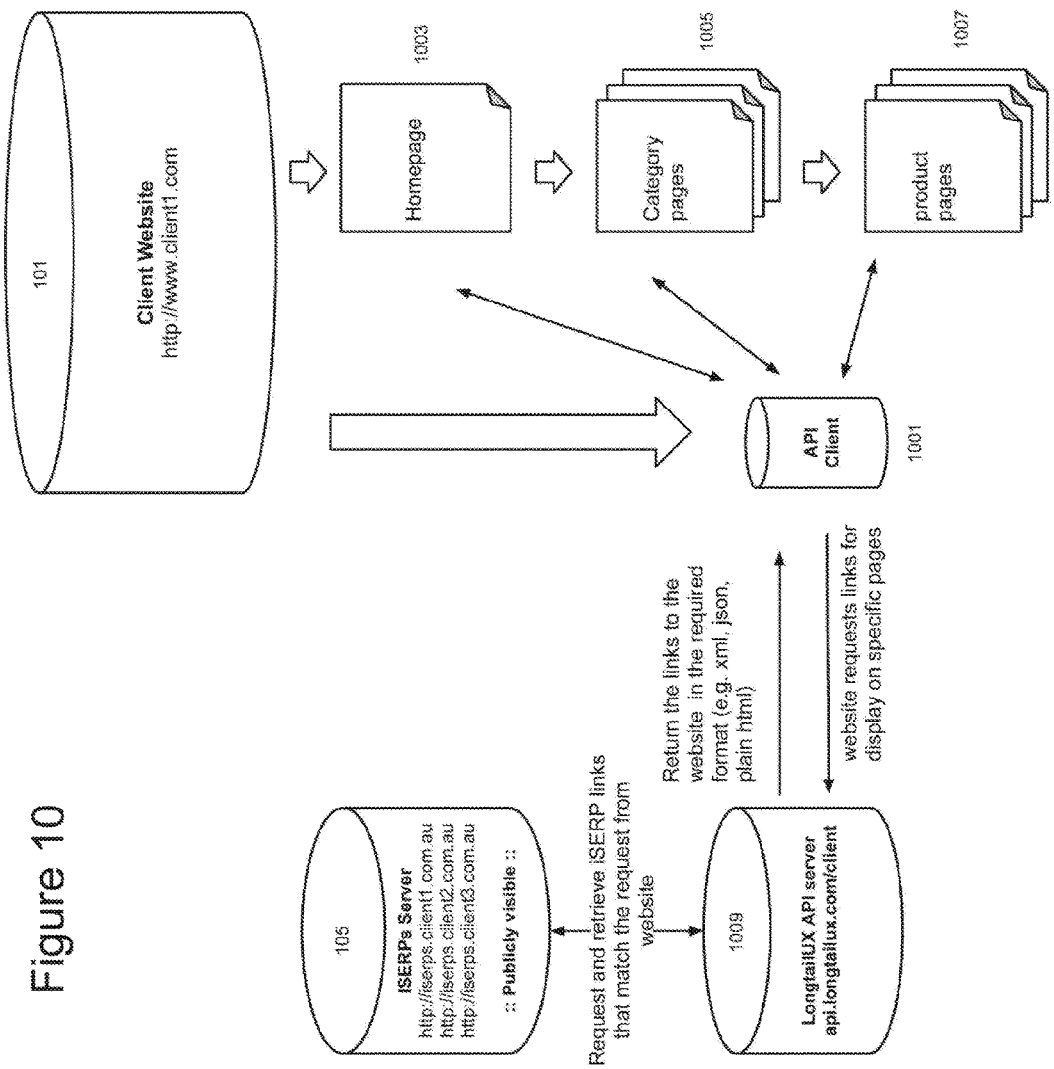
FIG. 10 shows a link generator module process according to an embodiment of the present invention.

FIG. 10 shows a link module process. The link module 129 is in the form of an API client 1001 that is located on various pages on the client's website 101. For example, the API client 1001 may be located on the homepage 1003, one or more category pages 1005 and/or one or more product pages 1007. The API client 1001 enables links to be retrieved from the server 105 via an API server 1009. The links are then displayed on one or more of the home page, category pages and product pages of the client website 101.

Further details of the operation of the link module are now provided. According to this embodiment, the request sent from the API client 1001 is in the following form: http://apis.longtailux.com/widget_1.0/{format}/{client_short_name}/{type}/{id}.

The variables are defined as shown in the following table:

| Variable name | Value | Description |
| --- | --- | --- |
| format | xml<br>html | The response format to be returned from the server |
| client_short_name | string | The client short name provided to indicate who the client is |
| type | homepage<br>category<br>product | The type of page on which the links are to be displayed |
| id | integer/string | The product/category ID that the client provides with the website content |

Examples of different requests are as follows:

http://apis.longtailux.com/widget_1.0/xml/client1/category/5 http://apis.longtailux.com/widget_1.0/xml/client1/product/49 http://apis.longtailux.com/widget_1.0/xml/client1/homepage

The API server 1009 sends a response to the API client 1001 as follows according to this embodiment. Two response formats are provided, HTML and XML.

HTML format renders the links as an 'unordered list' HTML tag (<ul></ul>). The request address can be included on the web server side script and CSS can be used to style the links as desired.

XML format provides more flexible options on how the HTML document may be rendered. Once the web application receives the response data, XML elements can be fetched and used with HTML tags as desired.

An example of an HTML response template is as follows:

```
<ul id="longtail_widget">
    <li><a href="http://iserp.client.com/iserp-page-1">iserp keyword
    1</a><li>
    <li><a href="http://iserp.client.com/iserp-page-2">iserp keyword
    2</a><li>
    <li><a href="http://iserp.client.com/iserp-page-3">iserp keyword
    3</a><li>
    ...
    ..
```

```
<li><a href="http://iserp.client.com/iserp-page-10">iserp keyword
10</a><li>
</ul>
```

For example:

```
<ul id="longtail_widget">
    <li><a href="http://iserp.client.com/photography-class-
    online">photography class online</a></li>
    <li><a href="http://iserp.client.com/photography-course-
    online">photography course online</a></li>
    <li><a href="http://iserp.client.com/study-photography-online">study
    photography online</a></li>
    ....
    ..
    .
</ul>
```

An example of an XML response template is:

```
<longtail_widget>
    <links>
        <link>
            <anchor>{keyword 1}</anchor>
            <url>{link1}</url>
        </link>
        <link>
            <anchor>{keyword 2}</anchor>
            <url>{link2}</url>
        </link>
        ....
        ..
        ...
        <link>
            <anchor>{keyword 10}</anchor>
            <url>{link10}</url>
        </link>
    </links>
</longtail_widget>
```

For example:

```
<longtail_widget>
    <links>
        <link>
            <anchor>product demo iserp 1</anchor>
            <url>http://iserp.demo_client.com/demo-iserp-1</url>
        </link>
        <link>
            <anchor>product demo iserp 2</anchor>
            <url>http://iserp.demo_client.com/demo-iserp-2</url>
        </link>
        <link>
            <anchor>product demo iserp 3</anchor>
            <url>http://iserp.demo_client.com/demo-iserp-3</url>
        </link>
    </links>
</longtail_widget>
```

Figure 11:
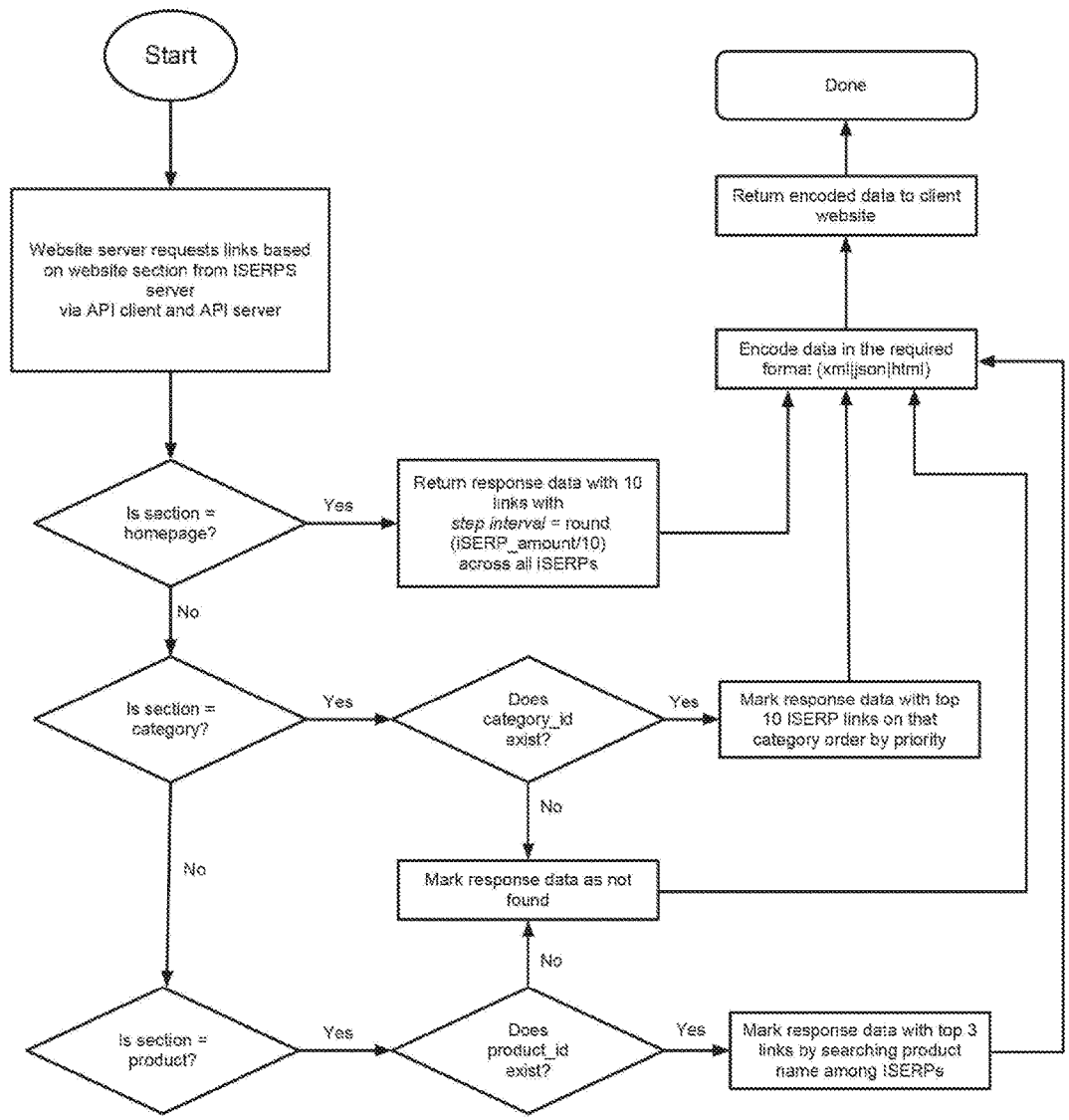
FIG. 11 shows a link generator module process flow diagram according to an embodiment of the present invention.

FIG. 11 shows a link generator module process flow diagram. The process starts by the website server requesting links based on the website section. The links are requested from the iSERPs server via the API client and API server. If the section is identified as the home page, response data is returned with ten links, for example, based on a defined step interval. For example, the step interval is based on the number of iSERPs divided by ten. If this section is identified as a category section, a determination is made as to whether a category ID exists. If a category ID does not exist, response data is marked as not found. Whereas if a category ID does exist, response data is marked with the top ten iSERPs links on that category order by priority. If the section is identified as a product section, a determination is made as to whether the product ID exists. If a product ID does not exist, the response data is marked as not found. Whereas, if the product ID does exist, the response data is marked with the top three links, for example, by searching the product name and by the iSERPs. After all sections have been processed, the data is encoded in the required format (XML, JSON, HTML). The encoded data is then returned to the client website for display in the appropriate sections of the website.

The herein described systems and methods therefore address specific issues such as, for example, avoiding high IT costs for on-page optimisation for the website owner.

Making Longtail keyword optimisation scalable, by automating the process and being able to launch 10 s of 1000 s of pages with the herein described system.

Taking the guess work out of the keyword selection: the herein described keyword tools enable the identification of not only the keywords with best traffic potential but also the ones with lowest current SEO competition.

Reducing risk of search engine penalties, since the system is building and displaying to search engines the most specific products/services of the client for the different Longtail keyword queries selected/targeted.

Making SEO 100% measurable and accountable: by the revenue generated from search engines "natural traffic" through the managed client subdomain or subdirectory.

Further, user experience is improved for users performing searches on the search engine due to lower user bounce rates, higher conversion rates etc.

The herein described system assists search engines in better understanding website content by helping the search engine to discover the content from many different angles than a previous website structure would allow. These different angles include a large variety of head and longtail keyword set variations for which the website content is relevant.

The system described herein presents these different aspects of the content on the website to the search engine, by:

A) Storing the website product and/or content feed in the system's database. This database is updated whenever the website's product and/or content feed is updated to ensure freshness of the content.

B) Researching the following:

Which keyword sets best describe the products and/or content? This relates to keyword set relevance.

Which keyword sets users of search engines typically use to search for the products and/or content as well as website topics? This relates to keyword set search volumes.

Identifying which keyword sets search engines already have relevant content in their index. Identifying how much relevant content the search engines have indexed. This relates to search engine keyword set competition.

C) Producing an "internal search results page" (iSERP) from the product and/or content feed in the system's database for each of the target keyword sets, and displaying the most relevant keyword set matching items from the product and/or content feed on each of these iSERP.

D) Hosting and caching these iSERPs on the system's servers.

E) Displaying this content to both users and search engines under the website's subdomain or under a subdirectory of the website's main domain.

F) Over time, launching multiple variations of these keyword sets and iSERPs for the website content.

G) Continuously testing which keyword sets work best for search engines and for users. This results in client content ranking well, therefore increasing traffic and revenue. Then, performing further ongoing research to identify new keyword set opportunities and replacing the keyword sets that have not performed as well for search engines, which results in no incremental traffic and/or revenue, or users, which results in high bounce rates or low conversion rates.

It will be understood that the embodiments of the present invention described herein are by way of example only, and that various changes and modifications may be made without departing from the scope of invention.

The invention claimed is:

1. A system for generating web pages for improving organic search rankings, associated with a website, the system comprising:
   a keyword generating module adapted to:
      retrieve one or more candidate keyword sets associated with website content,
      analyse the candidate keyword sets, and
      generate one or more target keyword sets based on the analysis of the candidate keyword sets;
   a web page generating module adapted to:
      retrieve website content data associated with the website content, and
      generate web pages based on the generated target keyword sets and the retrieved website content data;
   wherein the web page generating module is further adapted to communicate with a publicly visible web page server to enable the publicly visible web page server to store and serve the generated web pages; and
   a link logic module adapted to:
      define i) one or more links and between the generated new web pages, ii) one or more links from the generated web pages to the pages on the website and, iii) one or more links from the pages on the original website to the generated new web pages, and
      communicate with a link module adapted to retrieve and display the links defined by the link logic module on the website to make the links visible to search engines.

2. The system of claim 1 further comprising a publicly visible web page server adapted to store and serve the generated web pages.

3. The system of claim 2 wherein the web page server is external to the website and publishes the generated web pages onto a client sub domain URL pointing to an IP address of the web page server, or onto a client subdirectory URL via a server side URL rewrite.

4. The system of claim 1 further comprising a link module adapted to retrieve and display one or more of the links defined by the link logic module on the original website to make the one or more of the links defined by the link logic module visible to search engines.

5. The system of claim 4, wherein the one or more of the links defined by the link logic module that are displayed are links to one or more of the generated web pages.

6. The system of claim 1, wherein the target keyword sets comprise one or more keyword sets selected from the candidate keyword sets.

7. The system of claim 1, wherein the keyword generating module is further adapted to analyse a first candidate keyword set by performing a search on a search engine using the first candidate keyword set and producing a first target keyword set based on at least one keyword score that is based on organic search results of the search.

8. The system of claim 7, wherein the keyword generating module is further adapted to obtain the organic search results from the search engine for a first candidate keyword set, determine the keyword score based on the organic search results, determine whether the keyword score is above a defined score threshold value, and upon a positive determination that the keyword score is above a defined score threshold value, base a first target keyword set on the first candidate keyword set.

9. The system of claim 8, wherein the keyword score is further based on the number, type and structure of the obtained search results.

10. The system of claim 7, wherein the keyword score is based on a determination of one or more values selected from the list comprising: the number of words in the organic search results that exactly match the words within the first candidate keyword set; the number of words within the organic search results that are considered by the search engine to match the words in the first candidate keyword set; the number of pages appearing in the organic search results that have a page title tag that includes all the words within the first candidate keyword set; the number of pages appearing in the organic search results that have a page title tag that includes words that are considered to match the words within the first candidate keyword set.

11. The system of claim 7, wherein the keyword score is based on a determination of one or more values determined from the obtained organic search results, where the obtained organic search results are based on one or more of a general search and a search in webpage titles.

12. The system of claim 1, wherein the keyword generating module is further adapted to categorise target keyword sets based on descriptors that are based on the website content data.

13. The system of claim 1, wherein the keyword generating module is further adapted to associate descriptors that are based on the website content data with the target keyword sets.

14. The system of claim 1, wherein the website content data is product and/or service data associated with the content on the website.

15. The system of claim 1 further comprising a keyword ranking module adapted to retrieve, from the web page generating module, one or more target keyword sets, obtain organic search results for the retrieved target keyword sets, analyse the obtained organic search results to determine if a ranking associated with the obtained organic search results is below a defined ranking threshold value and, upon a determination that the ranking associated with the obtained organic search results is below the defined ranking threshold value, modify the retrieved target keyword sets.

16. The system of claim 15, wherein the keyword ranking module is further adapted to modify the retrieved target keyword sets by instructing the web page generating module to perform one or more actions on the retrieved target keyword sets selected from a list of actions comprising: deleting an existing keyword, changing an existing keyword, adding a new keyword.

17. The system of claim 1, wherein the web page generating module is further adapted to generate web pages by defining a unique resource locator for each web page, where the unique resource locator comprises at least a subset of all the keywords from one of the target keyword sets and a link to the web page server.

18. The system of claim 17, wherein the web page generating module is further adapted to generate web pages with one or more of: hyperlinks to other generated web pages; dynamic data based on the website content; a hyperlink to the website.

19. A method for generating web pages for improving organic search rankings associated with a website, the method comprising the steps of:
a keyword generating module retrieving one or more candidate keyword sets associated with website content in existing web pages of the original website, analysing the candidate keyword sets, and generating one or more target keyword sets based on the analysis of the candidate keyword sets;
a web page generating module retrieving website content data associated with the website content, and generating web pages based on the generated target keyword sets and the retrieved website content data; wherein the web page generating module is further adapted to communicate with a publicly visible web page server located on an external backend system to enable the publically visible web server to store and serve the generated web pages; and
a link logic module defining i) one or more links between generated new web pages, ii) one or more links from the generated new web pages to the pages on the original website and iii) one or more links from the pages on the original website to the generated new web pages, and communicating with a link module adapted to retrieve and display the links defined by the link logic module on the website to make the links visible to search engines.

20. The method of claim 19 further comprising the step of a publicly visible web page server storing and serving the generated web pages.

21. The method of claim 20 wherein the web page server is external to the website and hosts the generated web pages via a sub domain of the website.

22. The method of claim 19 further comprising the step of a link module retrieving and displaying one or more the links defined by the link logic module on the original website to make the one or more of the links defined by the link logic module visible to search engines.

23. The method of claim 22, wherein the one or more of the links defined by the link logic module that are displayed are links to one or more of the generated web pages.

24. The method of claim 19, wherein the target keyword sets comprise one or more keyword sets selected from the candidate keyword sets.

25. The method of claim 19, further comprising the steps of the keyword generating module analysing a first candidate keyword set by performing a search on a search engine using the first candidate keyword set and producing a first target keyword set based on at least one keyword score that is based on the organic search results of the search.

26. The method of claim 25, further comprising the steps of the keyword generating module obtaining the organic search results from the search engine for a first candidate keyword set, determining the keyword score based on the organic search results, determining whether the keyword score is above a defined score threshold value, and upon a positive determination that the keyword score is above a defined score threshold value, basing a first target keyword set on the first candidate keyword set.

27. The method of claim 26, further comprising the step of basing the keyword score on the number, type and structure of the obtained search results.

28. The method of claim 25, further comprising the step of basing the keyword score on a determination of one or more values selected from the list comprising: the number of words in the organic search results that exactly match the words within the first candidate keyword set; the number of words within the organic search results that are considered by the search engine to match the words in the first candidate keyword set; the number of pages appearing in the organic search results that have a page title tag that includes exact matches for the words within the first candidate keyword set; the number of pages appearing in the organic search results that have a page title tag that includes words that are considered to match the words within the first candidate keyword set.

29. The method of claim 25, further comprising the step of basing the keyword score on a determination of one or more values determined from the obtained organic search results, where the obtained organic search results are based on one or more of a general search and a search in webpage titles.

30. The method of claim 19, further comprising the step of the keyword generating module categorising target keyword sets based on descriptors that are based on the website content data.

31. The method of claim 19, further comprising the step of the keyword generating module associating descriptors that are based on the website content data with the target keyword sets.

32. The method of claim 19, wherein the website content data is product and/or service data associated with the content on the website.

33. The method of claim 19 further comprising the step of a keyword ranking module retrieving, from the web page generating module, one or more target keyword sets, obtaining organic search results for the retrieved target keyword sets, analysing the obtained organic search results to determine if a ranking associated with the obtained organic search results is below a defined ranking threshold value and, upon a determination that the ranking associated with the obtained organic search results is below the defined ranking threshold value, modifying the retrieved target keyword sets.

34. The method of claim 33, further comprising the step of the keyword ranking module modifying the retrieved target keyword sets by instructing the web page generating module to perform one or more actions on the retrieved target keyword sets selected from a list of actions comprising: deleting an existing keyword, changing an existing keyword, adding a new keyword.

35. The method of claim 19, further comprising the step of the web page generating module generating web pages by defining a unique resource locator for each web page, where the unique resource locator comprises at least a subset of all the keywords from one of the target keyword sets and a link to the web page server.

36. The method of claim 35, further comprising the step of the web page generating module generating web pages with one or more of: hyperlinks to other generated web pages; dynamic data based on the website content data; a hyperlink to the website.

* * * * *